(12) United States Patent
Chen et al.

(10) Patent No.: US 11,678,762 B2
(45) Date of Patent: Jun. 20, 2023

(54) RECORDING SYSTEM OF BREWING POUR OVER COFFEE AND COMPUTER PROGRAM PRODUCT THEREOF

(71) Applicant: QOFII INC., Taipei (TW)

(72) Inventors: Yi-Chun Chen, Taipei (TW); Te-Cheng Lee, Taipei (TW); Chien-Lung Huang, Taipei (TW); Ta-Wei Yeh, Taipei (TW); Tong-Yueh Yang, Taipei (TW)

(73) Assignee: QOFII INC., Taipei (TW)

( * ) Notice: Subject to any disclaimer, the term of this patent is extended or adjusted under 35 U.S.C. 154(b) by 725 days.

(21) Appl. No.: 16/720,055

(22) Filed: Dec. 19, 2019

(65) Prior Publication Data
US 2020/0205603 A1    Jul. 2, 2020

(30) Foreign Application Priority Data
Dec. 27, 2018   (TW) .................................. 107147476

(51) Int. Cl.
| A47J 31/42 | (2006.01) |
| A47J 31/56 | (2006.01) |
| A47J 31/44 | (2006.01) |
| A23F 5/08  | (2006.01) |
| A47J 31/02 | (2006.01) |
| A47J 31/00 | (2006.01) |

(52) U.S. Cl.
CPC .................. *A47J 31/42* (2013.01); *A23F 5/08* (2013.01); *A47J 31/02* (2013.01); *A47J 31/4475* (2013.01); *A47J 31/56* (2013.01); *A47J 31/007* (2013.01)

(58) Field of Classification Search
CPC ........ A47J 31/002; A47J 31/007; A47J 31/02; A47J 31/18; A47J 31/42; A47J 31/46; A47J 31/52
USPC ............................................................ 99/306
See application file for complete search history.

(56) References Cited

U.S. PATENT DOCUMENTS

| 8,910,563 | B2 * | 12/2014 | Hulett ................. A47J 31/4475 99/280 |
| 9,737,168 | B2 * | 8/2017 | Lee ........................ A47J 31/005 |
| 9,808,114 | B1 * | 11/2017 | Heys ........................ A47J 31/44 |
| 11,311,138 | B2 * | 4/2022 | Huang ................ B67D 1/0041 |
| 2020/0375388 | A1 * | 12/2020 | MacFarlane ....... G06Q 20/3224 |

\* cited by examiner

*Primary Examiner* — Reginald Alexander
(74) *Attorney, Agent, or Firm* — Cheng-Ju Chiang

(57) ABSTRACT

A recording system of brewing pour over coffee which comprises a touch screen, a robotic manipulator and a storage unit. The touch screen displays information, such as coffee drippers, water amounts, etc, thereon and for a user to input a process of brewing pour over coffee thereon. The touch screen allows the user to manage the status of the pour over coffee in real-time. The robotic manipulator equipped with a water injection unit, which moves the water injection unit according to the process of brewing pour over coffee to pour water to a coffee dripper simultaneously to make coffee. The storage unit stores data, such as a position where the water to be poured, a route of the process of brewing pour over coffee, a speed of the pouring motion and the required amount of water to be poured during the process of brewing pour over coffee.

6 Claims, 1 Drawing Sheet

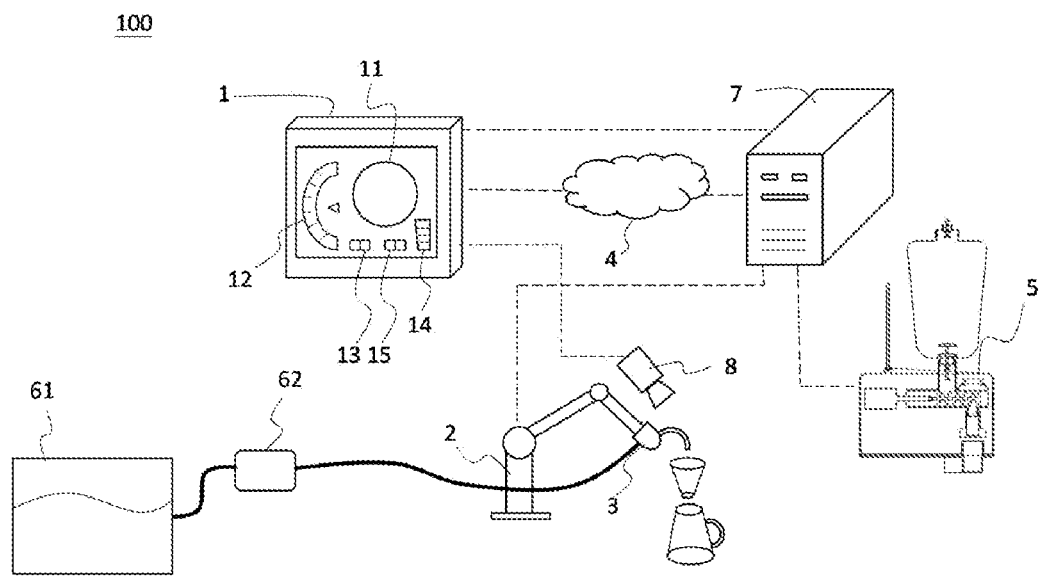

RECORDING SYSTEM OF BREWING POUR OVER COFFEE AND COMPUTER PROGRAM PRODUCT THEREOF

RELATED APPLICATIONS

The present application claims the priority of Taiwan Application No. 107147476, filed Dec. 27, 2018, the disclosures of which is hereby incorporated by reference herein in its entirety.

BACKGROUND OF THE INVENTION

1. Field of the Invention

The present disclosure generally relates to a recording system of brewing pour over coffee, and, more particularly, to a recording system for recording the process of brewing pour over coffee and reproducing coffee brewing process by the recorded process of brewing pour over coffee and a computer program product thereof.

2. Description of the Related Art

Pour over coffee, as the name implies, means pouring hot water on coffee grounds in a filter and extracting the coffee through the filter paper and coffee dripper. The entire brewing process takes a few minutes. Because the flow rate, the flow direction, the position where the water being poured and the temperature of the hot water are all controlled by a user, the extracted flavors of every cup of pour over coffee may be different from each other. Although the equipment for pour over coffee is simple, the quality of pour over coffee does rely on the user's skills and experiences.

Compared with other coffee brewing methods, a lot of factors may affect the flavor of pour over coffee brewing, including the flow rate of water, the water temperature, the particle size/shape of coffee grounds, the shape of the coffee drippers, etc. Adequate research and preparation are required before a pour over coffee is brewed. Every pour over coffee baristas may have their own unique brewing experience, method and skills, such as the pour over route, water temperature, water amount, and so on. Since those factors such as water temperature, water amount, extraction time, and so on are hardly observed visually, it is difficult to replicate someone's brewing way by other people.

Therefore, how to digitalize, record and analyze the brewing skills of baristas to reproduce them by modern technology and scientific methods has become an urgent problem to be solved in the industry.

SUMMARY OF THE INVENTION

In light of solving the foregoing problems of the prior art, the present invention provides a recording system of brewing pour over coffee. The recording system comprises a touch screen for a user to input a process of brewing pour over coffee thereon; a water injection unit used for pouring water to a coffee dripper; a robotic manipulator, wherein the water injection unit is set on the robotic manipulator and the robotic manipulator moves the water injection unit according to the process of brewing pour over coffee to pour water to the coffee dripper to make coffee; and a storage unit storing data generated by the process of brewing pour over coffee; a photographing unit, used for photographing a top view of the coffee dripper; wherein the top view image of the coffee dripper photographed by the photographing unit is displayed on the touch screen in real-time to enable the user to input the process of brewing pour over coffee on the touch screen.

According to an embodiment of the present invention, the recording system of brewing pour over coffee further comprises a grinder unit, used for grinding coffee beans and adjusting grind size of the coffee grounds.

According to an embodiment of the present invention, the recording system of brewing pour over coffee further comprises a tank used for storing water thereinside; and a pump connected to the tank; wherein the water is delivered at a predetermined rate from the tank to the water injection unit by the pump.

According to an embodiment of the present invention, the recording system of brewing pour over coffee further comprises a control unit electrically connected to the touch screen, the robotic manipulator, the grinder unit, the tank and the pump; wherein the control unit outputs at least one controlling signal to the robotic manipulator, the grinder unit, the tank and the pump according to the process of brewing pour over coffee inputted by the user to control the robotic manipulator to move the water injection unit, to adjust an amount of the water delivered to the water injection unit by the pump, to regulate water temperature of the water inside the tank and to control the grinder unit to adjust the grind size of the coffee grounds.

According to an embodiment of the present invention, the data comprises a data of moving route and a data of moving speed of the water injection unit moved by the robotic manipulator; a data of water poured from the water injection unit; a data of height from the water injection unit to the coffee grounds in the coffee dripper; a data of the water temperature of the water inside the tank; a data of the amount of the water delivered to the water injection unit by the pump; or a data of the grind size of the coffee grounds ground by the grinder unit.

According to an embodiment of the present invention, the recording system of brewing pour over coffee further comprises a photographing unit used for photographing a top view of the coffee dripper; wherein a top view image of the coffee dripper photographed by the photographing unit is displayed on the touch screen in real-time to enable the user to input the process of brewing pour over coffee on the touch screen.

According to an embodiment of the present invention, the touch screen is further used for displaying a top view image of a virtual coffee dripper thereon to enable the user to input the process of brewing pour over coffee on the touch screen.

The present invention provides a computer program product comprising a non-transitory computer readable program medium comprising a computer executable program code embodied thereon, the computer executable program code configured to cause a processor to enable a user to input a process of brewing pour over coffee on a touch screen, wherein the computer executable program code when executed by the processor causes the processor to perform operations comprising: displaying a top view image of a coffee dripper on the touch screen to enable the user to input a timing and a route of the process of brewing pour over coffee on the top view image of the coffee dripper on the touch screen; showing a water-amount-adjusting icon on the touch screen to enable the user to adjust a required amount of water to be poured at every point of the process of brewing pour over coffee via the water-amount-adjusting icon on the touch screen; measuring a speed of the pouring motion along its route and a height from the water to be poured to coffee grounds in the coffee dripper at every point of the process of brewing pour over coffee inputted by the user; and storing the route of the process of brewing pour over coffee, the required amount of water to be poured, the speed of the pouring motion and the height from the water to be poured to coffee grounds in the coffee dripper.

According to an embodiment of the present invention, the operations further comprises showing a grind-size-adjusting icon on the touch screen to enable the user to adjust grind size of the coffee grounds via the touch screen.

According to an embodiment of the present invention, the operations further comprises showing a height-adjusting icon on the touch screen to enable the user to adjust the height from the water to be poured to the coffee grounds in the coffee dripper via the touch screen.

According to an embodiment of the present invention, the operations further comprises showing a temperature-regulating icon on the touch screen to enable the user to regulate water temperature of the water to be poured during the process of brewing pour over coffee via the touch screen.

According to an embodiment of the present invention, the operations further storing at least one parameters affecting the process of brewing pour over coffee, wherein The at least one parameter comprises coffee species, origins, grades, planting/harvesting dates, fermentation process, roasting parameters, roasting date, roasterys, roasters, types of coffee drippers, brewing ratios or amounts of extraction of coffee.

Compared to the prior art, the recording system of brewing pour over coffee and the computer program product thereof of the present invention may display a top view image or a picture of the coffee dripper on the touch screen. The desired timing, positions may be inputted by the user on the touch screen and be stored by the recording system of brewing pour over coffee. Besides, the required amount of the water to be poured can be adjustable in real-time by the user either by the means of touch control or by the means of mechanical regulation, such as a physical button or knob. The present invention can record and reproduce the classic skills of a barista and brew a cup of delicious coffee.

BRIEF DESCRIPTION OF THE DRAWINGS

FIG. 1 illustrates a schematic view of a recording system of brewing pour over coffee according to the present invention.

DETAILED DESCRIPTION

The present invention is described by the following specific embodiments. Those with ordinary skills in the arts can readily understand other advantages and functions of the present invention after reading the disclosure of this specification.

It should be noted that the structures, ratios, sizes shown in the drawings appended to this specification are to be construed in conjunction with the disclosure of this specification in order to facilitate understanding of those skilled in the art. They are not meant, in any ways, to limit the implementations of the present invention, and therefore have no substantial technical meaning. Without affecting the effects created and objectives achieved by the present invention, any modifications, changes or adjustments to the structures, ratio relationships or sizes, are to be construed as fall within the range covered by the technical contents disclosed herein. Meanwhile, terms, such as "top", "bottom", "inner", "external", "one", "a" and the like, are for illustrative purposes only, and are not meant to limit the range implementable by the present invention. Any changes or adjustments made to their relative relationships, without modifying the substantial technical contents, are also to be construed as within the range implementable by the present invention.

Please refer to FIG. 1 which illustrates a schematic view of a recording system of brewing pour over coffee according to the present invention. The recording system of brewing pour over coffee 100 of the present invention comprises a touch screen 1, a water injection unit 3, a robotic manipulator 2 and a storage unit 4. The touch screen 1 may be for a user, such as a barista, to input a process of brewing pour over coffee on the touch screen. According to the present invention, to input a process of brewing pour over coffee by the user may be to input the process of brewing pour over coffee by the user via stylus pens, fingers or the like. According to the present invention, the input interface may be keyboards on-screen, arrow keys on-screen, handwriting on a handwriting panel or the like for the user to input information by touching or handwriting. It is worth noting that the term "barista" is for illustrative purposes only, and is not meant to limit the range implementable by the present invention, which means the barista can be any possible users.

According to an embodiment of the present invention, the robotic manipulator 2 may be controlled and moved by the touch screen 1 in real-time when the barista inputs the process of brewing pour over coffee on the touch screen 1. The water injection unit 3 may be set on the robotic manipulator 2, so the robotic manipulator 2 may move the water injection unit 3 simultaneously. The water injection unit 3 may be used for pouring water to a coffee dripper to make coffee. The real-time control of the robotic manipulator 2 by the user via the touch screen 1 may fed back immediately, which allow the user to be aware of the status of the pour over coffee during inputting of the process of brewing pour over coffee and subsequently to modify the input parameter straightway.

According to another embodiment of the present invention, the robotic manipulator 2 may be delayed controlled by the touch screen 1, which make the robotic manipulator 2 move the water injection unit 3 delayedly. The term "delayed" (or "delayedly") means nonimmediate or non-synchronized. According to the present invention, the barista may input parameters of any point of a timeline of the process of brewing pour over coffee on the touch screen 1 in advance and the robotic manipulator 2 may be controlled by the touch screen according to the inputted process of brewing pour over coffee. A pour over coffee may be brewed then in order to be taste or to be inspected by the barista. The storage unit 4 may be a memory element installed in the recording system of brewing pour over coffee 100, which may be a memory, a hard drive or the like. The information or data generated by the barista when he/she inputs the process of brewing pour over coffee may be stored in the storage unit 4 timely.

According to the present invention, the process of brewing pour over coffee may include, but not limited to the steps, such as grinding coffee beans, boiling water, pouring water, blooming, pouring water again or "sitting". The abovementioned steps may be changed or altered in accordance with different users.

According to an embodiment of the present invention, the recording system of brewing pour over coffee 100 may further comprise a grinder unit 5, a tank 61 used for storing water thereinside, a pump 62 and a control unit 7. The grinder unit 5 may be used for grinding coffee beans and adjusting grind size of the coffee grounds. The tank 61 may be a water tank equipped with a temperature controller. The pump 62 may be connected to the tank 61. The pump 62 may be used for moving the water inside the tank 61 and controlling an amount of the water. The water may be delivered at a predetermined rate from the tank 61 to the water injection unit 3 by the pump 62 and then poured out from the water injection unit 3. The control unit 7 may be a controlling element installed in the recording system of brewing pour over coffee 100. The control unit 7 may be electrically connected to the touch screen 1, the robotic manipulator 2, the grinder unit 5, the tank 61 and the pump 62. According to an embodiment of the present invention, the control unit 7 may output at least one controlling signal to the robotic manipulator 2, the grinder unit 5, the tank 61 and the pump 62 according to the process of brewing pour over coffee inputted by the user on the touch screen 1. The robotic manipulator 2 may control and move the water injection unit 3 according to the at least one controlling signal. The tank 61 may regulate water temperature of the water inside the tank 61 according to the at least one controlling signal. The pump 62 may adjust and deliver a predetermined amount of the water from the tank 61 to the water injection unit 3 where the water would be poured out according to the at least one controlling signal. The grinder unit 5 may grind and adjust the grind size of the coffee grounds according to the at least one controlling signal.

The information or data stored in the storage unit 4 when the barista inputs the process of brewing pour over coffee may comprise a moving route and a moving speed of the water injection unit 3 moved by the robotic manipulator 2; an amount of water poured from the water injection unit 3; a height from the water injection unit 3 to the coffee grounds in the coffee dripper; the water temperature of the water inside the tank 61; the amount of the water delivered to the water injection unit 3 by the pump 62; or the grind size of the coffee grounds ground by the grinder unit 5.

According to an embodiment of the present invention, the control unit 7 may be connected to the storage unit 4. The storage unit 4 stores some information and data of the process of brewing pour over coffee inputted by the user previously. The information and data stored in the storage unit 4 may be retrieved by the recording system of brewing pour over coffee 100. The control unit 7 may output at least one controlling signal and control the robotic manipulator 2, the grinder unit 5, the tank 61 and the pump 62 according to the stored data and information to reproduce a specific process of brewing pour over coffee.

Please note that, the touch screen 1, the storage unit 4 and the control unit 7 may be connected to each other wirelessly or wiredly to transmit signals, data or information. The touch screen 1 may be, for example a touch screen of smart phones, tablets, notebooks or desktops, or other combination devices that include independent touch screen modules and arithmetic control units for collaborative operation. If the touch screen 1 is a touch screen of smart phones, tablets, notebooks or desktops, the storage unit 4 may be a memory element installed in the smart phones, tablets, notebooks or desktops. Alternatively, the storage unit 4 may be an external hard drive or a cloud server, which means the touch screen 1 and the storage 4 may be electrically connected to other units or elements remotely. However, the storage unit 4 and the control unit 7 are not limited to the above-mentioned.

According to an embodiment of the present invention, the recording system of brewing pour over coffee 100 may further comprise a photographing unit 8. The photographing unit 8 may be set and take picture or film at the position which above the coffee dripper. A top view image of the coffee dripper photographed by the photographing unit 8 may be displayed on the touch screen 1 in real-time. The barista or the user may input the process of brewing pour over coffee on the top view image of of the coffee dripper shown on the touch screen 1. Specifically, the barista may control and watch the whole process of brewing pour over coffee via the touch screen 1.

Alternatively, in another embodiment of the present invention, the touch screen 1 may be used for displaying a top view image of a virtual coffee dripper on the touch screen 1 to enable the user to input the process of brewing pour over coffee on the top view image of the virtual coffee dripper shown on the touch screen. It is worth noted that, according to the present invention, the substitution of the coffee dripper may be other filter element with the same function used in pour over coffee, for example, filter paper, flannel or cotton filter, or the like.

The present invention further provides a computer program product which comprises a non-transitory computer readable program medium comprising a computer executable program code embodied thereon, the computer executable program code configured to cause a processor to enable a user to input a process of brewing pour over coffee on a touch screen. The computer executable program code may enable a user interface to display on the touch screen 1. More specifically, the user may input instructions on the user interface on the touch screen. The control unit 7 may further receive and compute the instructions to output at least one controlling signal to the other elements, such as the robotic manipulator 2, the grinder unit 5, the tank 61 or the pump 62 and control those elements simultaneously or non-simultaneously. According to the present invention, the computer executable program code when executed by the processor may causes the processor to perform operations. The operations may comprise displaying a top view image of a coffee dripper 11 on the touch screen 1 to enable the user, e.g. a barista, to input a timing and a route of the process of brewing pour over coffee on the top view image of the coffee dripper 11 on the touch screen 1. By doing so, the robotic manipulator 2 may move the water injection unit 3 synchronizedly or non-synchronizedly. The water injection unit 3 may be moved along the route of the process of brewing pour over coffee. The route of the process of brewing pour over coffee, the timing and the moving speed of the water injection unit 3 at any point of the route of the process of brewing pour over coffee may be stored in the storage unit 4. Wherein the moving speed of the water injection unit 3 may be the speed of the pouring motion.

According to the present invention, the operations may comprise showing a water-amount-adjusting icon 12 on the touch screen 1. The water-amount-adjusting icon 12 may include scales denoting the amount of water (the volume unit may be millimeter, mL) and an index indicating the current amount of water. The user, e.g. the barista, may adjust a required amount of water to be poured at every point of the process of brewing pour over coffee via the touch screen 1 by tapping or sliding on the water-amount-adjusting icon 12 with the user's fingers or even by handwriting. Once the required amount of water is determined, the control unit 7 may output a controlling signal to the pump 62. The pump 62 receives the controlling signal and adjusts the amount of water to be poured from the water injection unit 3. The water may be delivered at a predetermined rate from the tank 61 to the water injection unit 3 by the pump 62. For example, in an embodiment, when the required amount of water is determined to be 40 mL, the water may be delivered at a rate of 40 mL/10 s by the pump 62. The required amount of water to be poured at every point of the process of brewing pour over coffee may be stored in the storage unit 4.

In a more specific embodiment, when inputting the process of brewing pour over coffee via the touch screen 1, the barista may input the moving route on the top view image of the coffee dripper 11 by handwriting with the barista's fingers. The barista touches any point on the top view image of the coffee dripper 11, which means the water injection unit 3 may pour water at the certain point with the determined amount of water. When the barista handwrites the route on the top view image of the coffee dripper 11, the control unit 7 may control the robotic manipulator 2 to move the water injection unit 3 accordingly. In one embodiment, the barista may handwrites the route with one hand and adjust the amount of the water with the other hand. In one embodiment, once the barista's finger leaves the top view image of the coffee dripper 11 on the touch screen 1, the pump 62 would stop accordingly.

In another embodiment, the amount of water to be poured may be adjusted by a physical button or knob. In one embodiment, the water-amount-adjusting icon 12 may include an index indicating the current amount of water. The user, e.g. the barista, may adjust the amount of water to be poured by pressing the button or switching the knob.

In another embodiment of the present invention, the operations may comprise showing a grind-size-adjusting icon 13 on the touch screen 1. The user, e.g. the barista, may touch (tap, slide or the like) the grind-size-adjusting icon 13 to enable the grinder unit 5 to alter the burrs or blades and adjust the fineness/coarseness of the coffee grounds to adjust the grind size of the coffee grounds. The data or information of the type of the burrs or blades and the grind size of the coffee grounds may be stored in the storage unit 4.

In another embodiment of the present invention, the operations may further comprise showing a height-adjusting icon 14 on the touch screen 1. The user, e.g. the barista, may touch (tap, slide or the like) the height-adjusting icon 14 to adjust the height of the water injection unit 3. By doing so, the height from the water to be poured to the coffee grounds in the coffee dripper may be adjusted. The water poured from different heights may generate different force which may "stir" the coffee grounds in the coffee dripper properly. According to the present invention, the height of the water to be poured from coffee grounds in the coffee dripper may be stored in the storage unit 4.

According to an embodiment of the present invention, the operations may further comprise measuring a moving speed of the water injection unit 3, i.e. the speed of the pouring motion, and a height from the water to be poured/the water injection unit 3 to coffee grounds in the coffee dripper at every point of the process of brewing pour over coffee inputted by the user.

In another embodiment of the present invention, the operations may further comprise showing a temperature-regulating icon 15 on the touch screen 1. The user, e.g. the barista, may touch (tap, slide or the like) the temperature-regulating icon 15 to regulate water temperature of the water to be poured during the process of brewing pour over coffee via the touch screen. According to the present invention, the water temperature may be stored in the storage unit 4.

Besides, the operations may further comprise enabling the user to input at least one parameters affecting the process of brewing pour over coffee and storing the at least one parameters in the storage unit 4. The at least one parameters may comprise coffee varieties, origins, grades, planting/harvesting dates, fermentation process, roasting parameters, roasting date, roasterys, roasters, types of coffee drippers, brewing ratios, amounts of extraction of coffee or the like.

According to mentioned above, the recording system of brewing pour over coffee and the computer program product thereof according to the present invention may analyze and digitalize the brewing skills of baristas and record that by touch control and imaging technology. Others may represent the brewing skills of certain barista via the touch panel on a coffee machine, physical buttons, or even by the touch panel of a mobile phone to reproduce a delicious pour over coffee. The brewing skills of baristas may be preserved, represented and applied by the recording system of brewing pour over coffee and the computer program product thereof according to the present invention, which would help to share and disseminate the skills of brewing coffee and the skills will no longer be restricted to the barista individual.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A recording system of brewing pour over coffee, comprising:
   a touch screen, for a user to input a process of brewing pour over coffee thereon;
   a water injection unit, used for pouring water to a coffee dripper;
   a robotic manipulator, wherein the water injection unit is set on the robotic manipulator and the robotic manipulator moves the water injection unit according to the process of brewing pour over coffee to pour water to the coffee dripper to make coffee;
   a storage unit, storing data generated by the process of brewing pour over coffee; and
   a photographing unit, used for photographing a top view of the coffee dripper; wherein
   the top view image of the coffee dripper photographed by the photographing unit is displayed on the touch screen in real-time to enable the user to input the process of brewing pour over coffee on the touch screen.

2. The recording system of brewing pour over coffee of claim 1, further comprising:
   a grinder unit, used for grinding coffee beans and adjusting grind size of the coffee grounds.

3. The recording system of brewing pour over coffee of claim 2, further comprising:
   a tank, used for storing water thereinside; and
   a pump, connected to the tank; wherein
   the water is delivered at a predetermined rate from the tank to the water injection unit by the pump.

4. The recording system of brewing pour over coffee of claim 3, further comprising:
   a control unit, electrically connected to the touch screen, the robotic manipulator, the grinder unit, the tank and the pump; wherein
   the control unit outputs at least one controlling signal to the robotic manipulator, the grinder unit, the tank and the pump according to the process of brewing pour over coffee inputted by the user to control the robotic manipulator to move the water injection unit, to adjust an amount of the water delivered to the water injection unit by the pump, to regulate water temperature of the water inside the tank and to control the grinder unit to adjust the grind size of the coffee grounds.

5. The recording system of brewing pour over coffee of claim 4, wherein the data comprises:
- a data of moving route and a data of speed of the pouring motion moved by the robotic manipulator;
- a data of water poured from the water injection unit;
- a data of height from the water injection unit to the coffee grounds in the coffee dripper;
- a data of the water temperature of the water inside the tank;
- a data of the water delivered to the water injection unit by the pump; or
- a data of the grind size of the coffee grounds ground by the grinder unit.

6. The recording system of brewing pour over coffee of claim 1, wherein the touch screen is further used for displaying a top view image of a virtual coffee dripper thereon to enable the user to input the process of brewing pour over coffee on the touch screen.

* * * * *